United States Patent [19]

Nakajima et al.

[11] Patent Number: 4,696,994
[45] Date of Patent: Sep. 29, 1987

[54] TRANSPARENT AROMATIC POLYIMIDE

[75] Inventors: Kohei Nakajima; Kazuaki Nishio; Hiroshi Watanabe, all of Ichihara, Japan

[73] Assignee: Ube Industries, Ltd., Ube, Japan

[21] Appl. No.: 809,528

[22] Filed: Dec. 16, 1985

[30] Foreign Application Priority Data

Dec. 14, 1984 [JP] Japan .................................. 59-262976
Dec. 25, 1984 [JP] Japan .................................. 59-272079

[51] Int. Cl.$^4$ ............................................. C08L 79/08
[52] U.S. Cl. ..................................... 528/176; 528/187; 528/125; 528/126; 528/172
[58] Field of Search ............... 528/176, 187, 125, 126, 528/172

[56] References Cited

U.S. PATENT DOCUMENTS 4,526,838  7/1985  Fujioka et al. ...................... 528/172
4,568,715  2/1986  Itantani et al. ...................... 528/172

Primary Examiner—John Kight
Assistant Examiner—M. L. Moore
Attorney, Agent, or Firm—Frishauf, Holtz, Goodman & Woodward

[57] ABSTRACT

A transparent aromatic polyimide produced by polymerization and imidation of an aromatic tetracarboxylic acid containing as a principal component biphenyltetracarboxylic acid and an aromatic diamine containing as a principal component bis(aminophenoxy-phenyl)sulfone of the formula (I) or bis(aminophenoxy-phenyl)-propane of the formula (II):

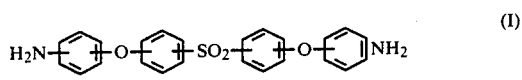

(I)

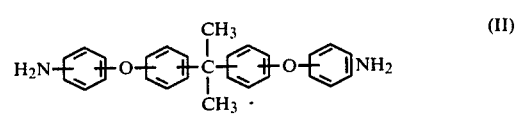

(II)

19 Claims, No Drawings

TRANSPARENT AROMATIC POLYIMIDE

BACKGROUND OF THE INVENTION

1. Field of the Invention

This invention relates to a new aromatic polyimide and particularly relates to an aromatic polyimide which is superior in transparency, resistance to coloring and solubility in an organic polar solvent.

2. Description of Prior Art

It has been known to employ an aromatic polyimide for forming an electrically insulating protective film (i.e., interlayer insulation film) in electric or electronic material industries. For instance, Japanese Patent Provisional Publications No. 48(1973)-34686 and No. 49(1974)-40077 have proposed to prepare an insulating film of a solid element, passivation film and layer insulation film of a semiconductive integrated circuit by employing an aromatic polyimide in view of its excellent characteristics in heat resistance and insulating property.

However, aromatic polyimides of the prior art have drawbacks in that these are sparingly soluble in organic solvents. Therefore, a protective film of an aromatic polyimide is necessarily prepared by steps of forming a coated film of a solution of an aromatic polyimide precursor (i.e., aromatic polyamic acid) and subjecting the coated film to a heat treatment at a relatively high temperature for a long period of time for drying and imidizing. It is difficult in the prior art to prepare a protective film at a relatively low temperature with high reproducibility. Therefore, according to the prior art, electric or electronic parts to be protected the polyimide film are liable to deteriorate by the applied heat.

On the other hand, aromatic polyimides which are soluble in an organic polar solvent have been already disclosed in, for example, Japanese Patent Publication No. 57(1982)-41491. These aromatic polyimides, however, are generally colored yellow, brown or reddish brown and not satisfactory in transmissibility for visible rays. Accordingly, these polyimides are not suitable as a display element of liquid crystals, or a protective film of a light sensor and solar cell.

SUMMARY OF THE INVENTION

An object of the present invention is to provide an aromatic polyimide having an improved transparency and an improved solubility in an organic solvent.

There is provided by the present invention a transparent aromatic polyimide produced by polymerization and imidation of an aromatic tetracarboxylic acid containing as a principal component biphenyltetracarboxylic acid and an aromatic diamine containing as a principal component bis(aminophenoxy-phenyl)sulfone of the formula (I) or bis(aminophenoxy-phenyl)propane of the formula (II):

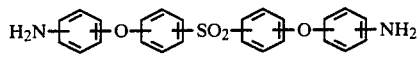
(I)

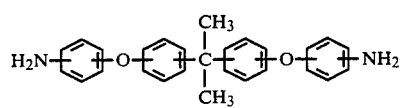
(II)

Further provided by the invention is an aromatic polyimide composition wherein the above aromatic polyimide is uniformly dissolved in a polar organic solvent.

DETAILED DESCRIPTION OF THE INVENTION

The transparent aromatic polyimide according to the invention is superior in light transmissibility, colorlessness and solubility in an organic solvent, as well as electric and mechanical characteristics and heat resistance. Therefore, the invention specifically provides an aromatic polyimide composition (namely, varnish) useful for forming a protective film for electrically insulating electric or electronic parts.

In more detail, the aromatic polyimide of the present invention is satisfactory in solubility in organic polar solvents such as phenol type solvents and amide type solvents (e.g. pyrrolidone type solvents, formamide type solvents and acetamide type solvents). Further, it is easy to prepare the above-mentioned aromatic polyimide composition (varnish) containing the aromatic polyimide in the solvent and having a relatively low viscosity.

Accordingly, a protective film produced from the aromatic polyimide composition having a thickness of approx. 0.5 to 500 μm can be easily prepared by coating a surface of various kinds of electric or electronic parts with the composition and subjecting the coated surface to heat-drying treatment at a relatively low temperature.

Further, the aromatic polyimide of the invention is satisfactory in transparency and colorlessness because it has improved transmissibility for visible rays. Therefore, the aromatic polyimide of the invention can be used for various purposes such as a film for oriented liquid crystals, protective material for liquid crystals display element, color filter material for color liquid crystal panel, protective films for photosensor and solar cells, through the conventional aromatic polyimide cannot be used for these purposes because of its coloring such as yellow, brown and reddish brown.

Moreover, since the aromatic polyimide of the present invention is satisfactory, like the aromatic polyimides of prior arts, in mechanical strength, heat resistance and electrically insulating property, the polyimide of the invention is suitable for forming a protective film and an interlayer insulation film for various kinds of electric or electronic parts.

The aromatic polyimide of the invention can be prepared by performing polymerization and imidation in one stage by heating an aromatic tetracarboxylic acid component and an aromatic diamine component in an amount of approx. equivalent molar ratio in an organic polar solvent at a relatively high temperature (preferably 100°-300° C., and more preferably 140°-250° C.), said aromatic tetracarboxylic acid component containing biphenyltetracarboxylic acid in an amount of preferably not less than 80 mol.% and said aromatic diamine component containing bis(aminophenoxy-phenyl)sulfone of the formula (I) and/or bis(aminophenoxy-phenyl)propane of the formula (II):

(I)

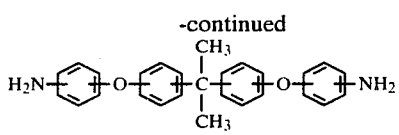

(II)

in an amount of preferably not less than 80 mol.%.

The aromatic polyimide of the invention can be also prepared by steps of polymerizing the above two components in the amount of approx. equivalent molar ratio in an organic polar solvent at a temperature preferably not higher than 80° C., and more preferably in the range of 0°-60° C. so as to obtain an aromatic polyamic acid (precursor of aromatic polyimide) and imidizing the aromatic polyamic acid under appropriate conditions.

Examples of the above biphenyltetracarboxylic acid include 3,3′,4,4′-biphenyltetracarboxylic acid, acid dianhydride thereof, 2,3,3′,4′-biphenyltetracarboxylic acid, acid dianhydride thereof, esterified products of the aromatic tetracarboxylic acids, and salts of the the aromatic tetracarboxylic acids. In the invention, 2,3,3′,4′-biphenyltetracarboxylic acid and acid dianhydride thereof are preferred to obtain an aromatic polyimide having high solubility.

The aromatic tetracarboxylic acid component may contain, in addition to the biphenyltetracarboxylic acid, 3,3′,4,4′-benzophenonetetracarboxylic acid, acid dianhydride thereof, 2,3,3′4′-benzophenonetetracarboxylic acid, acid dianhydride thereof, pyromellitic acid, acid dianhydride thereof, and other aromatic tetracarboxylic acids. The aromatic tetracarboxylic acid component may contain the above-mentioned aromatic tetracarboxylic acid in the amount of not more than 20 mol.%, and preferably not more than 10 mol.% based on the total amount of aromatic tetracarboxylic acid component.

Examples of the bis(aminophenoxy-phenyl)sulfone which is the principal component of the aromatic diamine component and represented by the formula (I) include bis[-4-(4′-aminophenoxy)phenyl]sulfone and bis[4-(3′-aminophenoxy)phenyl]sulfone. At least one hydrogen of the benzene rings of the aromatic diamine compound of the formula (I) may be substituted with a suitable substituent (e.g., a lower alkyl group such as a methyl, ethyl or propyl group, or a lower alkoxy group such as a methoxy or ethoxy group).

Examples of the bis(aminophenoxy-phenyl)propane which is the alternative principal component of the aromatic diamine component and represented by the formula (II) include 2,2-bis[4-(4′-aminophenoxy)-phenyl]propane and 2,2-bis[4-(3′-aminophenoxy)-phenyl]propane. At least one hydrogen of the benzene rings of the aromatic diamine compound of the formula (II) may be substituted with a suitable substituent (e.g., a lower alkyl group such as a methyl, ethyl or propyl group, or a lower alkoxy group such as a methoxy or ethoxy group).

The aromatic diamine component may contain, in addition to said bis(aminophenoxy-phenyl)sulfone and-/or bis(aminophenoxy-phenyl)propane, other aromatic diamine compounds such as p-phenylenediamine, m-phenylenediamine, 2,4-diaminotoluene, 4,4′-diaminodiphenyl ether, 4,4′-diaminodiphenylmethane, o-tolidine, 1,4-bis(4-aminophenoxy)benzene, and o-tolidinesulfone. These aromatic diamine compounds may be contained in the aromatic diamine component in the amount of not more than 20 mol.%, and preferably not more than 10 mol.% based on the total amount of the aromatic diamine component.

As the organic polar solvent employable in the polymerization reaction, sulfoxide type solvents such as dimethylsulfoxide and diethylsulfoxide, formamide type solvents such as N,N-dimethylformamide and N,N-diethylformamide, acetamide type solvents such as N,N-dimethylacetamide and N,N-diethylacetamide, pyrrolidone type solvents such as N-methyl-2-pyrrolidone and N-vinyl-2-pyrrolidone, hexamethylenesulfoxide, γ-butyrolactone, and phenol type solvents such as phenol, o-, m- or p-cresol, xylenol, halogenated phenol (e.g., p-chlorophenol, o-chlorophenol and p-bromophenol) and catechol.

It is preferred that the aromatic polyimide of the invention is a high molecular polymer and has a logarithmic viscosity number (showing polymerization degree of polymer) of from 0.2 to 5.0, and preferably 0.3 to 3.0 determined at a concentration of 0.5 g/100 ml in N-methyl-2-pyrrolidone at a temperature of 30° C.

The aromatic polyimide of the invention can be easily dissolved not only in similar organic polar solvents to those employable in the polymerization reaction and but also in mixed solvents consisting of the organic polar solvents and other solvents such as xylene, ethylcellosolve, diglyme and dioxane. Accordingly, a solution of the aromatic polyimide (varnish or dope liquid for forming a film), that is, a preferred aromatic polyimide composition of the invention in which the aromatic polyimide is uniformly dissolved in an organic polar solvent at a concentration of approx. 1–30 weight %, preferably 3–25 weight %, and the rotary viscosity number (viscosity determined at 25° C. by means of a rotational viscometer) is 0.1–100,000 poise, preferably 1–10,000 poise can be easily prepared.

The aromatic polyimide composition of the invention may be in the form of a polymerization reaction liquid of the aromatic polyimide obtained by polymerizing and imidizing the monomer components in an organic polar solvent at one stage in the manner as mentioned above. Further, the polymerization reaction liquid may be so diluted with a similar organic polar solvent to the polymerization reaction solvent as to have an appropriate concentration. The aromatic polyimide composition can be also prepared by steps of isolating an aromatic polyimide powder from the polymerization reaction liquid and dissolving the aromatic polyimide powder in a polar polar solvent.

The aromatic polyimide composition of the invention can be coated on a surface of a material to be protected (e.g., circuit substrate and photosensor) with uniform thickness at a room temperature or under heating by a suitable method employing a rotary coating device (e.g., spin coater) or printing machine so as to form a coated film of the aromatic polyimide composition (aromatic polyimide solution). Subsequently, the coated film is dried by heating at a temperature not lower than 50° C., and preferably in the range of 60°-250° C. so as to obtain a transparent solid film of the aromatic polyimide.

In the case that sulfoxide type solvents, formamide type solvents, acetamide solvents, pyrrolidone type solvents or amide type solvents such as hexamethylenephosphoamide are employed as the organic polar solvents, the coated film can be dried at a relatively low temperature in the range of 60°-200° C., especially 80°-180° C.

The aromatic polyimide according to the invention has excellent solubility in pyrrolidone type solvents as mentioned above. In case that the formed film has a thickness less than 30 μm, especially less than 20 μm, the film is substantially colorless and transparent.

EXAMPLE 1

To 18.0 ml of N-methyl-2-pyrrolidone(NMP) were added 1.64 g. of 2,3,3',4'-biphenyltetracarboxylic acid dianhydride and 2.43 g. of bis[4-(4'-aminophenoxy)-phenyl]sulfone. The resulting solution was kept under stirring in a stream of nitrogen gas at a temperature of 20° C. for 5 hours to perform polymerization so as to obtain an aromatic polyamic acid.

Subsequently, 11.4 g. of acetic anhydride and 4.26 g. of pyridine were added to the aromatic polyamic acid after diluting the acid with 55.8 ml of NMP. The obtained solution was subjected to imidation at 50° C. for 3 hours to produce an aromatic polyimide. To the solution was further added methanol to precipitate the produced aromatic polyimide. The aromatic polyimide was then filtered so as to obtain an aromatic polyimide powder.

The obtained aromatic polyimide was dissolved in NMP at a temperature of approx. 30° C. and the solubility and logarithmic viscosity in a solvent at a concentration of 0.5 g/100 ml at a temperature of 30° C. were measured. The logarithmic viscosity was 0.62 and the solubility was higher than 20 weight %.

The above obtained aromatic polyimide was dissolved in NMP at a temperature of approx. 30° C. so as to obtain a uniform aromatic polyimide solution having a concentration of approx. 14 weight %.

The rotary viscosity number of the above obtained aromatic polyimide solution was measured at a temperature of 25° C. to give 6 poise.

The aromatic polyimide solution was coated on a surface of a glass precoated with SiO₂ by means of a spin coater (1,000–3,000 r.p.m.) and heated for drying at a temperature of 80° C. for 60 minutes so as to form a thin film (thickness: approx. 5 μm) of the aromatic polyimide.

Transmission of the film without heat treatment as well as that of the film having been subjected to heat treatment in an air at 350° C. for 30 minutes were measured at a wavelength of 400 nm or 440 nm by using an automatic spectrophotometer (manufactured by Hitachi Ltd., Type 330).

The color of the thin film made of the aromatic polyimide (heat-treated film) was observed, and a temperature at which heat decomposition starts was determined by means of a calorimeter (manufactured by E. I. du Pont de Nemours and Company, Type 951).

The obtained results are shown in Table 1.

EXAMPLE 2

To 23.6 ml of N-methyl-2-pyrrolidone (NMP) were added 2.15 g. of 3,3',4,4'-biphenyltetracarboxylic acid dianhydride and 3.17 g. of bis[4-(4'-aminophenoxy)-phenyl]sulfone. The resulting solution was subjected to polymerization in a nitrogen atmosphere at a temperature of 20° C. under stirring for 5 hours, so as to produce an aromatic polyamic acid.

Subsequently, 15.06 g. of acetic anhydride and 5.76 g. of pyridine were added to the solution of the aromatic polyamic acid after diluting the solution with 66.0 ml of NMP. The resulting solution was subjected to imidation at a temperature of 50° C. for 3 hours to produce an aromatic polyimide. By adding methanol to the solution, aromatic polyimide was precipitated. The precipitated polyimide was filtered to obtain an aromatic polyimide powder.

Solubility and logarithmic viscosity of thus obtained aromatic polyimide were measured in the same manner as in Example 1. The logarithmic viscosity was 1.33 and the solubility was higher than 20 weight %.

The above aromatic polyimide was dissolved in NMP at a temperature of approx. 30° C. to prepare a uniform aromatic polyimide solution having concentration of 14 weight %.

The rotary viscosity number of the prepared aromatic polyimide solution was measured at 25° C. to give 780 poise.

Further, a thin film was prepared in the same manner as in Example 1 except that the above-obtained aromatic polyimide solution was employed.

The light transmission and heat decomposition starting temperature of the film were measured in the same manner as in Example 1. The results are shown in Table 1.

EXAMPLE 3

To 24.0 ml of N-methyl-2-pyrrolidone (NMP) were added 1.85 g. of 2,3,3',4'-biphenyltetracarboxylic acid dianhydride and 2.76 g. of bis[4-(4'-aminophenoxy)-phenyl]sulfone. The resulting solution was subjected to polymerization and imidation at one stage under stirring for 5 hours in a nitrogen atmosphere at a temperature of 180° C. so as to obtain an aromatic polyimide solution having a rotary viscosity number of 110 poise at 25° C.

The aromatic polyimide contained in said solution was recovered, and the solubility and logarithmic viscosity thereof were measured in the same manner as in Example 1. The logarithmic viscosity was 0.90 and the solubility was higher than 20 weight %.

A thin film was prepared in the same manner as in Example 1 except that the above-aromatic polyimide solution was employed. The light transmission and heat decomposition starting temperature of the film were measured in the same manner as in Example 1. The results are shown in Table 1.

TABLE 1

| | Nature of film of aromatic polyimide film | | | | | |
|---|---|---|---|---|---|---|
| | Transmission (%) | | | | | |
| | Before heat treatment | | After heat treatment | | Heat decomposition starting | Tone of |
| Example | 400 nm | 440 nm | 400 nm | 440 nm | temperature (°C.) | color |
| 1 | 85 | >96 | 90 | 94 | 425 | Very light yellow |
| 2 | 84 | 96 | 86 | 97 | 430 | Very light yellow |
| 3 | 94 | >98 | 92 | 97 | 420 | Very light yellow |

EXAMPLE 4

To 12.0 ml of N-methyl-2-pyrrolidone(NMP) were added 1.31 g. of 2,3,3',4'-biphenyltetracarboxylic acid dianhydride and 1.85 g. of bis[4-(4'-aminophenoxy)-phenyl]propane. The resulting solution was kept under stirring in the stream of nitrogen gas at a temperature of 20° C. for 5 hours to complete polymerization so as to obtain an aromatic polyamic acid.

Subsequently, 8.75 g. of acetic anhydride and 3.34 g. of pyridine were added to the aromatic polyamic acid after diluting the acid with 56.0 ml of NMP. The obtained solution was subjected to imidation at 50° C. for 3 hours to produce an aromatic polyimide. To the solution was further added methanol to precipitate the produced aromatic polyimide. The aromatic polyimide was then filtered so as to obtain an aromatic polyimide powder.

The obtained aromatic polyimide was dissolved in NMP at a temperature of approx. 30° C. and the solubility and logarithmic viscosity in a solvent at a concentration of 0.5 g/100 ml at a temperature of 30° C. were measured. The logarithmic viscosity was 1.28 and the solubility was higher than 20 weight %.

The above obtained aromatic polyimide was dissolved in NMP at a temperature of approx. 30° C. so as to obtain a uniform aromatic polyimide solution having concentration of approx. 14 weight %.

The rotary viscosity number of the above-obtained aromatic polyimide solution was measured at a temperature of 25° C. to give 420 poise.

The aromatic polyimide solution was coated on a surface of a glass precoated with $SiO_2$ by means of a spin coater (500–6,000 r.p.m.) and heated for drying at a temperature of 80° C. for 60 minutes so as to form a thin film (thickness: approx. 5 μm) of the aromatic polyimide.

Transmission of the film without heat treatment as well as that of the film having been subjected to heat treatment in an air at 350° C. for 30 minutes were measured at a wavelength of 400 nm or 440 nm by using an automatic spectrophotometer (manufactured by Hitachi Ltd., Type 330).

The color of the thin film made of the aromatic polyimide (heat-treated film) was observed, and a temperature at which heat decomposition starts was determined by means of a calorimeter (manufactured by E. I. du Pont de Nemours and Company, Type 951).

The obtained results are shown in Table 2.

EXAMPLE 5

To 15.0 ml of N-methyl-2-pyrrolidone (NMP) were added 1.57 g. of 3,3′,4,4′-biphenyltetracarboxylic acid dianhydride and 2.22 g. of bis[4-(4′-aminophenoxy)-phenyl]propane. The resulting solution was subjected to polymerization in a nitrogen atmosphere at a temperature of 20° C. under stirring for 5 hours, so as to produce an aromatic polyamic acid.

Subsequently, 10.50 g. of acetic anhydride and 4.01 g. of pyridine were added to the solution of the aromatic polyamic acid after diluting the solution with 56.0 ml of NMP. The resulting solution was subjected to imidation at a temperature of 50° C. for 3 hours to produce an aromatic polyimide. By adding methanol to the solution, aromatic polyimide was precipitated. The precipitated polyimide was filtered to obtain an aromatic polyimide powder.

Solubility and logarithmic viscosity of thus obtained aromatic polyimide were measured in the same manner as in Example 4. The logarithmic viscosity was 1.61 and the solubility was higher than 20 weight %.

The above aromatic polyimide was dissolved in NMP at a temperature of approx. 30° C. to prepare a uniform aromatic polyimide solution having concentration of 14 weight %.

The rotary viscosity number of the prepared aromatic polyimide solution was measured at 25° C. to give 780 poise.

Further, a thin film was prepared in the same manner as in Example 4 except that the above-obtained aromatic polyimide solution was employed.

The light transmission and heat decomposition starting temperature of the film were measured in the same manner as in Example 4. The results are shown in Table 2.

EXAMPLE 6

To 51.0 ml of N-methyl-2-pyrrolidone (NMP) were added 3.53 g. of 2,3,3′,4′-biphenyltetracarboxylic acid dianhydride and 5.00 g. of bis[4-(4′-aminophenoxy)-phenyl]propone. The resulting solution was subjected to polymerization and imidation at one stage under stirring for 5 hours in a nitrogen atmosphere at a temperature of 180° C. so as to obtain an aromatic polyimide solution having rotary viscosity number of 920 poise at 25° C.

The aromatic polyimide contained in said solution was recovered, and the solubility and logarithmic viscosity thereof were measured in the same manner as in Example 4. The logarithmic viscosity was 1.42 and the solubility was higher than 20 weight %.

A thin film was prepared in the same manner as in Example 4 except that the above-aromatic polyimide solution was employed. The light transmission and heat decomposition starting temperature of the film were measured in the same manner as in Example 4. The results are shown in Table 2.

TABLE 2

| | Nature of film of aromatic polyimide film | | | | | |
|---|---|---|---|---|---|---|
| | Transmission (%) | | | | | |
| | Before heat treatment | | After heat treatment | | Heat decomposition starting | Tone of |
| Example | 400 nm | 440 nm | 400 nm | 440 nm | temperature (°C.) | color |
| 4 | 80 | 95 | 85 | 96 | 410 | Very light yellow |
| 5 | 82 | 95 | 86 | 95 | 420 | Very light yellow |
| 6 | 92 | 97 | 88 | 96 | 415 | Very light yellow |

We claim:

1. A transparent aromatic polyimide produced by polymerization and imidation of an aromatic tetracarboxylic acid containing as a principal component biphenyltetracarboxylic acid and an aromatic diamine containing as a principal component bis(aminophenoxyphenyl)sulfone of the formula (I) or bis(aminophenoxyphenyl)propane of the formula (II):

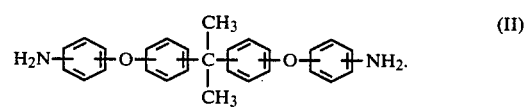

2. The aromatic polyimide claimed in claim 1, wherein the polyimide is in the form of film.

3. The aromatic polyimide claimed in claim 1 or 2, wherein said aromatic tetracarboxylic acid contains said biphenyltetracarboxylic acid in an amount of not less than 80 mol.%.

4. The aromatic polyimide claimed in claim 1 or 2, wherein said aromatic diamine contains said bis(aminophenoxy-phenyl)sulfone or bis(aminophenoxy-phenyl)propane in an amount of not less than 80 mol.%.

5. The aromatic polyimide claimed in claim 1 or 2, wherein said bis(aminophenoxy-phenyl)sulfone or bis(aminophenoxy-phenyl)propane is selected from the group consisting of bis[4-(4'-aminophenoxy)phenyl]sulfone, bis[4-(3'-aminophenoxy)phenyl]sulfone, 2,2-bis[4-(4'-aminophenoxy)phenyl]propane, and 2,2-bis[4-(3'-aminophenoxy)phenyl]propane.

6. An aromatic polyimide composition containing an aromatic polyimide produced by polymerization and imidation of an aromatic tetracarboxylic acid containing as a principal component biphenyltetracarboxylic acid and an aromatic diamine containing as a principal component bis(aminophenoxy-phenyl)sulfone of the formula (I) or bis(aminophenoxy-phenyl)propane of the formula (II):

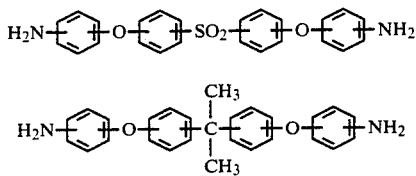

dissolved in a polar organic solvent.

7. The aromatic polyimide composition claimed in claim 6, wherein the polar organic solvent is selected from the group consisting of a sulfoxide type solvent, a formamide type solvent, an acetamide solvent, a pyrrolidone type solvent and an amide type solvent.

8. The aromatic polyimide composition claimed in claim 6 or 7, wherein said aromatic tetracarboxylic acid contains said biphenyltetracarboxylic acid in an amount of not less than 80 mol.%.

9. The aromatic polyimide composition claimed in claim 6 or 7, wherein said aromatic diamine contains said bis(aminophenoxy-phenyl)sulfone or bis(aminophenoxy-phenyl)propane in an amount of not less than 80 mol.%.

10. The aromatic polyimide composition claimed in claim 6 or 7, wherein said bis(aminophenoxy-phenyl)sulfone or bis(aminophenoxy-phenyl)propane is selected from the group consisting of bis[4-(4'-aminophenoxy)phenyl]sulfone, bis[4-(3'-aminophenoxy)phenyl]sulfone, 2,2-bis[4-(4'-aminophenoxy)phenyl]propane, and 2,2-bis[4-(3'-aminophenoxy)phenyl]propane.

11. The aromatic polyimide composition claimed in claim 7 wherein said solvent is selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, N-vinyl-2-pyrrolidone, hexamethylenesulfoxide, δ-butyrolactone, phenol, o-cresol, m-cresol, p-cresol, xylenol, p-chorophenol, o-chlorophenol, p-bromophenol and catechol.

12. The aromatic polyimide claimed in claim 1 wherein said biphenyl tetracarboxylic acid component contains 3,3',4,4'-benzophenonetetracarboxylic acid, the acid anhydride thereof, 2,3,3',4'-benzophenonetetracarboxylic acid, the acid anhydride thereof, pyromelatic acid and the acid anhydride thereof in an amount of not more than 20 mol % of the total amount of said aromatic tetracarboxylic acid component.

13. The aromatic polyimide claimed in claim 1 wherein said aromatic diamine component contains a member selected from the group consisting of p-phenylenediamine, m-phenylenediamine, 2,4-diaminotoluene, 4,4'-diaminodiphenyl ether, 4,4'-diaminodiphenylmethane, o-tolidine, 1,4-bis-(4-aminophenoxy)benzene and o-tolidinesulfone in an amount of not more than 20 mol % based on the total amount of the aromatic diamine component.

14. The aromatic polyimide composition according to claim 6 wherein said aromatic polyimide is present in said solvent in a concentration of about 1-30 wt. %.

15. The aromatic polyimide composition according to claim 6 wherein said aromatic polyimide is present in said solvent in a concentration of about 3-25 wt. %.

16. The aromatic polyimide according to claim 1 wherein said biphenyltetracarboxylic acid is 2,3,3'4'-biphenyltetracarboxylic acid dianhydride and said aromatic diamine is bis[4-(4'-aminophenoxy)phenyl]sulfone.

17. The aromatic polyimide according to claim 1 wherein said biphenyltetracarboxylic acid is 3,3',4,4'-biphenyltetracarboxylic acid dianhydride and said aromatic diamine is bis[4-(4'aminophenoxy)phenyl]sulfone.

18. The aromatic polyimide according to claim 1 wherein said biphenyltetracarboxylic acid is 2,3,3',4'-biphenyltetracarboxylic acid dianhydride and said aromatic diamine is bis[4-(4'-aminophenoxy)phenyl]propane.

19. The aromatic polyimide according to claim 1 wherein said biphenyltetracarboxylic acid is 3,3'4,4'-biphenyltetracarboxylic acid dianhydride and said aromatic diamine is bis[4-(4'-aminophenoxy)phenyl]propane.

* * * * *